(12) United States Patent
Chiang et al.

(10) Patent No.: US 9,163,786 B2
(45) Date of Patent: Oct. 20, 2015

(54) ENERGY CAPTURING SYSTEM AND PRESSURE STABILIZING DEVICE THEREOF

(71) Applicant: INDUSTRIAL TECHNOLOGY RESEARCH INSTITUTE, Hsinchu (TW)

(72) Inventors: Shih-Ying Chiang, Hualien County (TW); Yi-Chen Li, Zhubei (TW); Sheng-Chung Lo, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 196 days.

(21) Appl. No.: 14/019,165

(22) Filed: Sep. 5, 2013

(65) Prior Publication Data
US 2014/0130911 A1 May 15, 2014

(30) Foreign Application Priority Data

Nov. 9, 2012 (TW) .............................. 101141896 A (51) Int. Cl.
*F16D 31/00* (2006.01)
*F03B 7/00* (2006.01)
*F17D 1/20* (2006.01)
*G05D 16/16* (2006.01)

(52) U.S. Cl.
CPC ................ *F17D 1/20* (2013.01); *G05D 16/166* (2013.01); *Y10T 137/86035* (2015.04)

(58) Field of Classification Search
CPC . F17D 1/20; G05D 16/166; Y10T 137/86035
USPC ..................... 60/325, 639, 495, 496
See application file for complete search history.

(56) References Cited

U.S. PATENT DOCUMENTS

| 644,093 A | 2/1900 | Place |
| 2,129,292 A | 9/1938 | Vinson |

(Continued)

FOREIGN PATENT DOCUMENTS

| CN | 2670709 Y | 1/2005 |
| CN | 201984354 U | 9/2011 |

(Continued)

OTHER PUBLICATIONS

Dahai Zhang et al., An overview of hydraulic systems in wave energy application in China, Renewable and Sustainable Energy Reviews, 2012, p. 4522-4526, vol. 16.

(Continued)

*Primary Examiner* — Hoang Nguyen
(74) *Attorney, Agent, or Firm* — Locke Lord LLP; Tim Tingkang Xia, Esq.

(57) ABSTRACT

An energy capturing system includes a first chamber, a second chamber, a spacer element, a pressurization device, an energy capturing device and a pressure stabilizing device. The first chamber and the second chamber are adapted to contain a liquid. The spacer element is located between the first chamber and the second chamber. The second chamber is connected with the first chamber via an opening of the spacer element. Two ends of the pressurization device are connected with the first chamber and the second chamber, respectively. The energy capturing device is located on the opening. The pressure stabilizing device is connected with the first chamber.

13 Claims, 8 Drawing Sheets

(56) References Cited

U.S. PATENT DOCUMENTS

| | | | |
|---|---|---|---|
| 2,893,433 | A | 7/1959 | Macduff |
| 3,163,985 | A | 1/1965 | Bouyoucos |
| 3,339,513 | A * | 9/1967 | Cloutier .......................... 114/50 |
| 3,581,774 | A | 6/1971 | Oeland, Jr. et al. |
| 4,022,117 | A | 5/1977 | Mallian |
| 4,309,154 | A * | 1/1982 | Daddario ..................... 417/337 |
| 5,179,837 | A | 1/1993 | Sieber |
| 7,188,471 | B2 | 3/2007 | Walters |
| 8,839,616 | B1 * | 9/2014 | Perez .............................. 60/398 |
| 2012/0067036 | A1 | 3/2012 | Fong et al. |
| 2012/0153627 | A1 * | 6/2012 | Jo .................................. 290/53 |

FOREIGN PATENT DOCUMENTS

| | | |
|---|---|---|
| CN | 102312876 A | 1/2012 |
| TW | M353998 U | 4/2009 |
| TW | 201024533 A | 7/2010 |
| TW | M400515 U | 3/2011 |
| TW | M411563 U | 9/2011 |
| TW | M421983 U | 2/2012 |
| WO | 2011025156 A2 | 3/2011 |

OTHER PUBLICATIONS

Heidi Heikkinen et al., Analytical study of the interaction between waves and cylindrical wave energy converters oscillating in two modes, Renewable Energy, 2013, p. 150-160, vol. 50.

Ross Henderson, Design, simulation, and testing of a novel hydraulic power take-off system for the Pelamis wave energy converter, Renewable Energy, 2006, p. 271-283, vol. 31.

M. Eriksson et al., Hydrodynamic modelling of a direct drive wave energy converter, International Journal of Engineering Science, 2005, p. 1377-1387, vol. 43.

James D. Van De Ven et al., Liquid piston gas compression, Applied Energy, 2009, p. 2183-2191, vol. 86.

State Intellectual Property Office of the P.R.C., "Office Action", Jul. 1, 2015, China.

Intellectual Property Office, Ministry of Economic Affairs, R.O.C., "Office Action", May 13, 2015, Taiwan.

* cited by examiner

ENERGY CAPTURING SYSTEM AND PRESSURE STABILIZING DEVICE THEREOF

CROSS-REFERENCE TO RELATED APPLICATIONS

This non-provisional application claims priority under 35 U.S.C. §119(a) on Patent Application No(s). 101141896 filed in Taiwan, R.O.C. on Nov. 9, 2012, the entire contents of which are hereby incorporated by reference.

TECHNICAL FIELD

The disclosure relates to an energy capturing system and a pressure stabilizing device thereof.

BACKGROUND

After the industrial revolution, people considerably utilized fuels, for example, coal, petroleum and natural gas, as a source of energy. The thermal energy generated from burning the above-mentioned fuels is converted into kinetic energy, and may be further converted into the electric energy. For example, steam engines, which boil the water by fuels, make the water change from a liquid phase to a vapor phase. Then, the water vapor propels a piston to move to produce mechanical work, which means the thermal energy in the boiling water is accordingly converted into kinetic energy. Moreover, the steam engines convert the kinetic energy into electric energy when the piston is further connected with an electromagnetic component. For another example, an explosion is generated inside a vehicle engine by means of the combustion of the air mixed with the gasoline extracted from the petroleum. After the explosion, the expanded air propels the piston and produces mechanical work, accordingly converting the chemical energy in the gasoline into kinetic energy. However, the fuel combustion, which converts chemical energy in the fuels into kinetic energy, also produces a large quantity of unnecessary thermal energy to dissipate outside. Therefore, the efficiency of the energy conversion from the chemical energy to the kinetic energy is not good enough, let alone the efficiency of the energy conversion from the kinetic energy to the electric energy.

Moreover, there is a shortage of the above-mentioned energy due to the increase of the human population. Even researchers have proposed the solutions of extracting petroleum from grains like sweet corn; nevertheless, those solutions may cause a food shortage. Therefore, it is necessary to seek renewable energy resources from nature in order to solve the shortage of an energy (e.g., wind power generation, hydraulic power generation and wave power generation).

However, renewable electricity production, from sources such as wind power and wave power, is sometimes criticized for being variable or intermittent. Therefore, how to acquire stable energy from the natural environment is a problem that researchers from the related industry try to solve.

SUMMARY

An embodiment of the disclosure provides an energy capturing system comprising a first chamber, a second chamber, a spacer element, a pressurization device, an energy capturing device and a pressure stabilizing device. The first chamber and the second chamber are adapted to contain a liquid. The spacer element is located between the first chamber and the second chamber. The second chamber is connected with the first chamber via an opening of the spacer element. Two ends of the pressurization device are connected with the first chamber and the second chamber, respectively. The energy capturing device is located on the opening. The pressure stabilizing device is connected with the first chamber.

According to the disclosure, a pressure stabilizing device includes a fulcrum, a lever, a second chamber, a compensating fluid, a compensation chamber, a compensation controller, a first cylinder, a second cylinder, a third cylinder, a first piston, a second piston and a third piston. The lever is pivoted on the fulcrum. The second chamber is used to contain a gas. The compensation chamber is used to contain the compensating fluid. The compensation controller is connected with the compensation chamber. The first cylinder is connected with a first chamber, the second cylinder is connected with the compensation chamber and the third cylinder is connected with the second chamber. The first piston, the second piston and the third piston are located in the first cylinder, the second cylinder and the third cylinder, respectively. The first piston, the second piston and the third piston are pivoted on the lever.

BRIEF DESCRIPTION OF THE DRAWINGS

The disclosure is more fully understood from the detailed description given herein below for illustration only, and thus are not limitative of the disclosure, and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
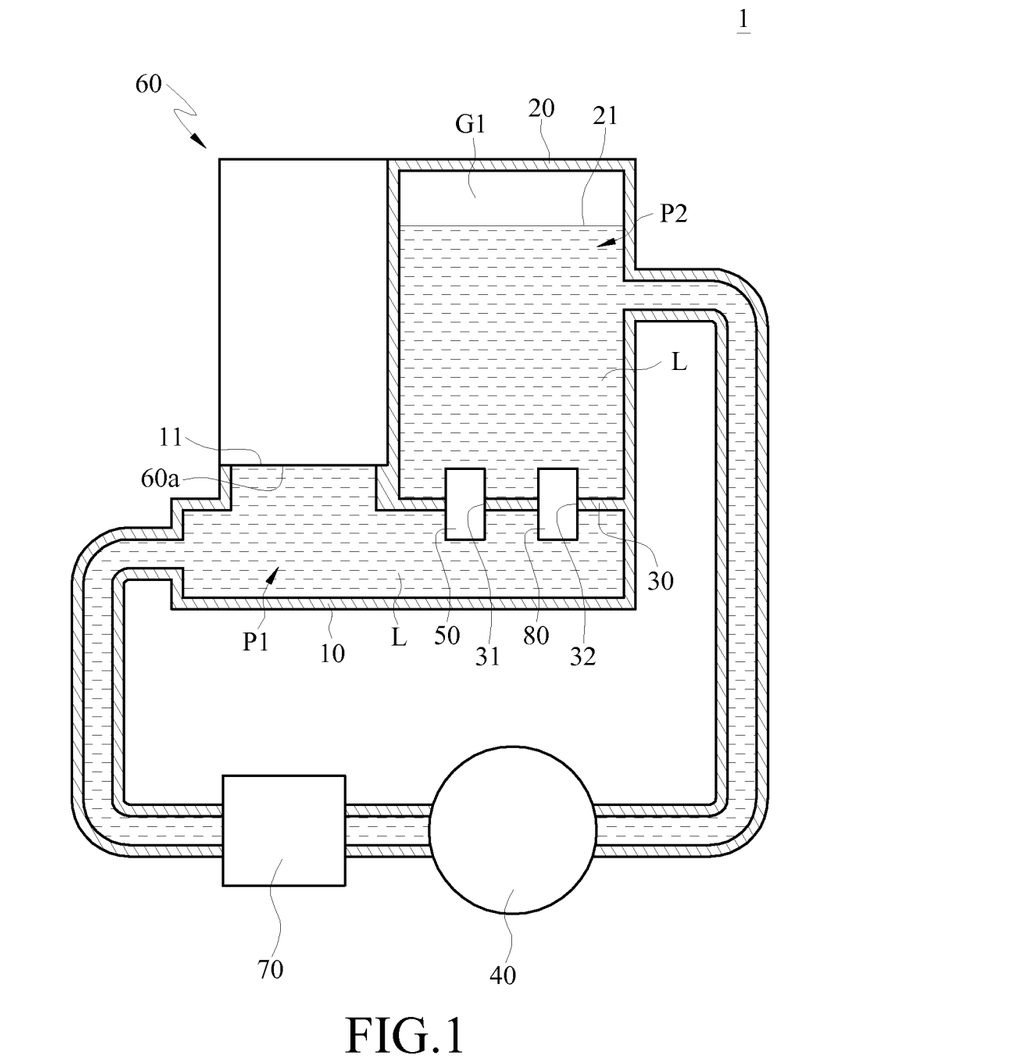
FIG. 1 is a schematic cross-sectional view of an energy capturing system according to an embodiment of the disclosure.

Please refer to FIG. 1, which is a schematic cross-sectional view of an energy capturing system according to an embodiment of the disclosure. The energy capturing system 1 comprises a first chamber 10, a second chamber 20, a spacer element 30, a pressurization device 40, an energy capturing device 50 and a pressure stabilizing device 60. The first chamber 10 and the second chamber 20 are adapted to contain a liquid L. The spacer element 30 is located between the first chamber 10 and the second chamber 20. The second chamber 20 is connected with the first chamber 10 via an opening of the spacer element 30. One end of the pressurization device 40 is connected with the first chamber 10 and the other end of the pressurization device 40 is connected with the second chamber 20. The pressurization device 40 is adapted to pressurize the liquid L having a first pressure P1 and deliver the liquid L to the first chamber 10, thereby the first pressure P1 is higher than a second pressure P2 of the liquid L contained in the second chamber 20. The energy capturing device 50 is located in the first opening 31, which is used to capture the differential energy between the first pressure P1 and the second pressure P2. The liquid L having the first pressure P1 transferred to the liquid having the second pressure P2 only by passing through the energy capturing device 50, which is located in the first opening 31 of the spacer element 30, instead of passing through the pipes. Therefore, the waste of the differential energy between the first pressure P1 and the second pressure P2, resulted from the friction between the liquid L and the pipes, is avoided. The pressure stabilizing device 60 is connected with a connected hole 11 of the first chamber 10 via a connected port 60a, for stabilizing the first pressure P1 of the liquid L inside the first chamber 10. In this disclosure, a differential energy is defined as energy resulted from the difference of pressure between the first pressure P1 and the second pressure P2.

In this embodiment of the disclosure, the energy capturing system 1 further includes an elastic membrane 21, and the second chamber 20 is adapted to contain a first gas G1. The elastic membrane 21 is adapted to separate the first gas G1 from the liquid L.

In this embodiment of the disclosure, the energy capturing system 1 further includes a one-way valve (namely, a check valve) 70 which is located on the pressurization device 40. The one-way valve 70 is adapted to limit the liquid L to only flow from the second chamber 20 to the pressurization device 40 and the first chamber 10 in sequence. In other words, the liquid L may not flow from the first chamber 10 to the pressurization device 40 and the second chamber 20 in sequence by the limitation of the one-way valve 70.

In this embodiment of the disclosure, the energy capturing system 1 further includes a pressure valve 80, which is located in a second opening 32 of the spacer element 30. The pressure valve 80 opens when the differential energy between the first pressure P1 and the second pressure P2 is higher than a specified pressure, thereby the first chamber 10 is connected with the second chamber 20 via the pressure valve 80.

The pressurization device 40 includes a fan blade (not shown) or a buoy (not shown). The fan blade is applied to wind power and hydraulic power generation, while the buoy is applied to the wave generation. The pressurization device 40 pushes the liquid L by an external kinetic energy. Because the flow direction of the liquid L is restricted by the one-way valve, the pressurization device 40 pushes the liquid L which flows toward the pressurization device 40 from the second chamber 20, and further pushes the pressurized liquid L to the first chamber 10. Therefore, the pressurization device 40 makes the first pressure P1 of the liquid L inside the first chamber 10 higher than the second pressure P2 inside the second chamber 20. However, the unstable energy in nature (e.g. wind power, hydraulic power and wave energy) makes the first pressure P1 fluctuated or intermittent. Therefore, the liquid L inside the first chamber 10 is not only pressurized by the pressurization device 40, but also stabilized by the pressure stabilizing device 60, which makes the first pressure P1 stable rather than fluctuated or intermittent.

The energy capturing device 50 captures the differential energy by the pressure difference between the first pressure P1 and the second pressure P2 when the first pressure P1 is higher than the second pressure P2. For example, the energy capturing device 50 is a generator set, but the disclosure is not limited thereto. The liquid L flows into the second chamber 20 from the first chamber 10 because the first pressure P1 is higher than the second pressure P2. In the flowing process, the energy capturing device 50 converts the kinetic energy of the liquid L into electric energy by an electromagnetic effect. The pressure valve 80 opens and the first chamber 10 is connected with the second chamber 20 via the pressure valve 80 when the pressurization device 40 pressures the liquid L to a great extent, which may be over the acceptable range of the pressure stabilizing device 60. In other words, the pressure stabilizing device 60 may not stabilize the pressure of the liquid L when the pressure is too high. The liquid L inside the first chamber 10 flows into the second chamber 20 via the pressure valve 80 for releasing redundant pressure, which prevents the energy capturing device 50 and the pressure stabilizing device 60 from failure by the high pressure of the pressurization device 40. In addition, some of the liquid L flows into the pressure stabilizing device 60 via the connected port 60a when the pressure of the liquid L is so high that the liquid L needs to be stabilized by the pressurization device 40. At this moment, the elastic membrane 21 is moved toward the liquid L. On the contrary, some of the liquid L inside the pressure stabilizing device 60 flows back to the first chamber 10 via the connected port 60a when the pressurized extent of the liquid L is so low that the liquid L needs to be stabilized by the pressurization device 40. At this moment, the elastic membrane 21 is moved toward the first gas G1.

Figure 2A:
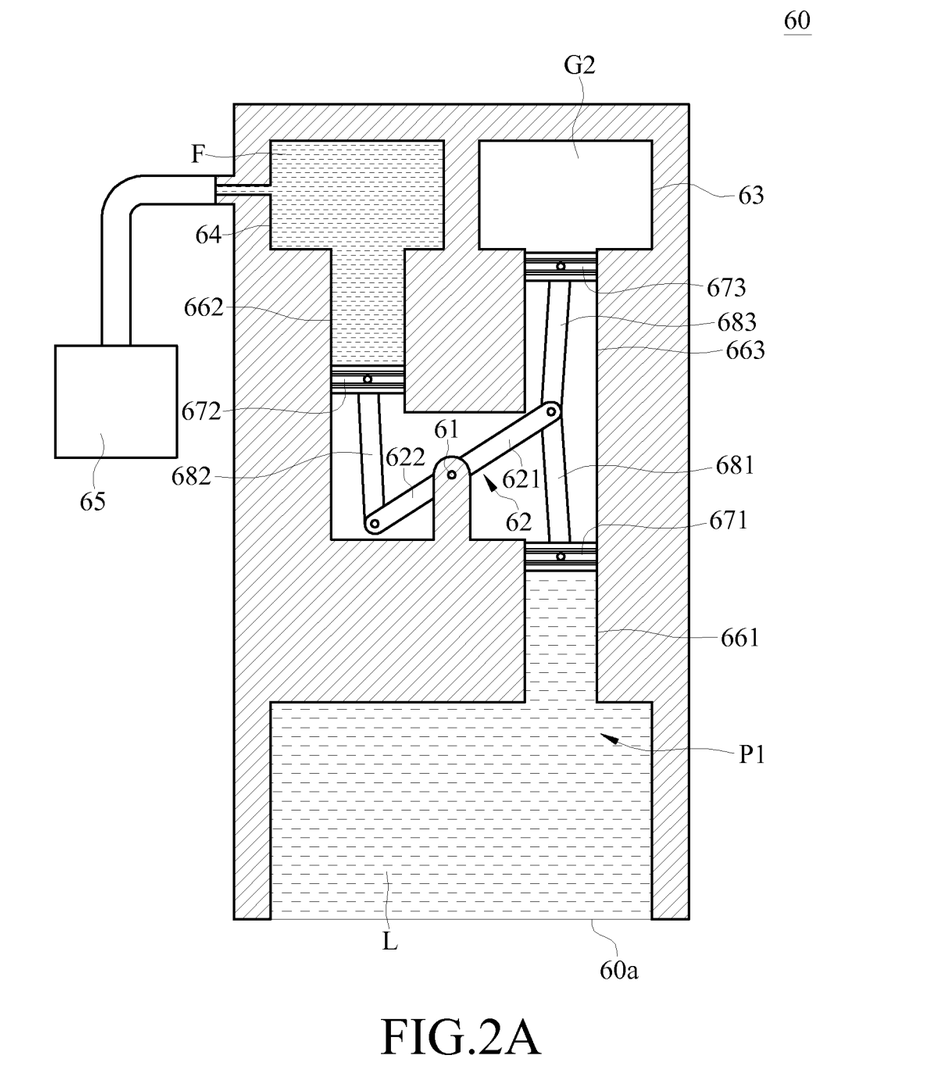
FIG. 2A and FIG. 2B are schematic cross-sectional views of a pressure stabilizing device described in FIG. 1A.
Figure 2B:
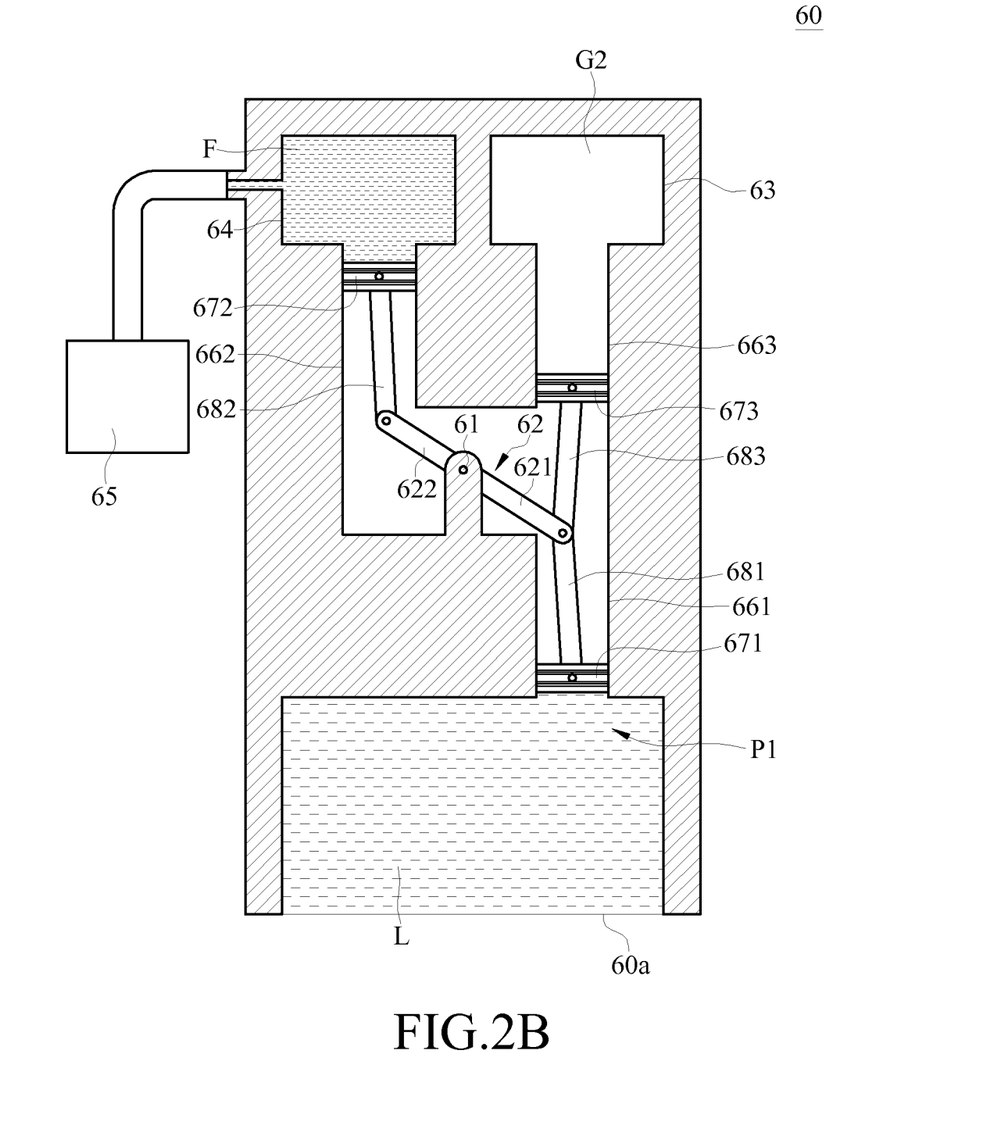

Please refer to FIG. 2A and FIG. 2B, which are schematic cross-sectional view of a pressure stabilizing device described in FIG. 1A. The pressure stabilizing device 60 includes a fulcrum 61, a lever 62, a third chamber 63, a compensating fluid F, a compensation chamber 64, a compensation controller 65, a first cylinder 661, a second cylinder 662, a third cylinder 663, a first piston 671, a second piston 672, a third piston 673, a first connecting rod 681, a second connecting rod 682 and a third connecting rod 683. The lever 62 is pivoted on the fulcrum 61. The third chamber 63 contains a second gas G2. The compensation chamber 64 contains a compensating fluid F. The compensation controller 65 is connected with the compensation chamber 64. The first cylinder 661 is connected with the connected hole 11 of the first chamber 10 via a connected port 60a. The second cylinder 662 is connected with the compensation chamber 64. The third cylinder 663 is connected with the third chamber 63. The first piston 671, the second piston 672 and the third piston 673 are located in the first cylinder 661, the second cylinder 662 and the third cylinder 663, respectively. The first piston 671, the second piston 672 and the third piston 673 are pivoted on the lever 62 via the first connecting rod 681, the second connecting rod 682 and the third connecting rod 683, respectively. A first moment (namely, torque), a second moment and a third moment are formed by forces applying to the first piston 671, the second piston 672 and the third piston 673 and the lever 62 on the fulcrum 61, respectively.

The liquid L, having the first pressure P1 and being inside the first chamber 10, pushes the first piston 671 inside the first cylinder 661, which makes a force applying to the lever 62 via the first connecting rod 681, thereby producing the first moment in a counterclockwise direction on the fulcrum 61. The compensating fluid F inside the compensation chamber 64 pushes the second piston 672 inside the second cylinder 662, which makes a force apply to the lever 62 via the second connecting rod 682, thereby producing the second moment in a counterclockwise direction on the fulcrum 61. The second gas G2 inside the third chamber 63 pushes the third piston 673 inside the third cylinder 663, which makes a force apply to the lever 62 via the third connecting rod 683, thereby producing the third moment in a clockwise direction on the fulcrum 61.

Both the first moment and the second moment have the same counterclockwise directions, while the third moment is clockwise and is contrary to the first moment and the second moment. When the third moment varies, the compensation controller 65 increases or decreases the second moment by controlling the compensating fluid F, which stabilizes the first moment and the first pressure P1.

In this embodiment of the disclosure, the liquid L is contained not only inside the first chamber 10 but also in a part of the first cylinder 661. The liquid L is sealed by the first piston 671, which prevents the liquid L from flowing into the space containing the fulcrum 61 and the lever 62. The compensating fluid F is contained not only inside the compensation chamber 64 but also in a part of the second cylinder 662. The compensating fluid F is sealed by the second piston 672, which prevents the compensating fluid F from flowing into the space containing the fulcrum 61 and the lever 62. The second gas G2 is contained not only inside the third chamber 63 but also in a part of the third cylinder 663. The second gas G2 is sealed by the third piston 673, which prevents the second gas G2 from flowing into the space containing the fulcrum 61 and the lever 62. When the temperature is fixed and the third piston 673 moves along the third cylinder 663, the pressure and volume of the second gas G2 change accordingly. The volume of the second gas G2 is inversely proportional to the pressure itself in the fixed temperature according to the Boyle's law.

The lever 62 has a first side 621 and a second side 622 which are opposite to each other, and the first side 621 and the second side 622 are separated by the fulcrum 61. The first piston 671 and the third piston 673 are pivoted on the first side 621, while the second piston 672 is pivoted on the second side 622. An applied force is performed on the first side 621 by the first piston 671, for producing the first moment on the fulcrum 61. An applied force is performed on the second side 622 by the second piston 672, for producing the second moment on the fulcrum 61. An applied force is performed on the first side 621 by the third piston 673, for producing the third moment on the fulcrum 61. The first cylinder 661 and the third cylinder 663 are located with the same axis. When the lever 62 rotates clockwise the first piston 671 approaches toward the first chamber 10, the second piston 672 approaches toward the compensation chamber 64, and the third piston 673 moves away from third chamber 63. On the contrary, when the lever rotates counterclockwise the first piston 671 moves away from the first chamber 10, the second piston 672 moves away from the compensation chamber 64, and the third piston 673 approaches toward the third chamber 63.

Figure 2C:
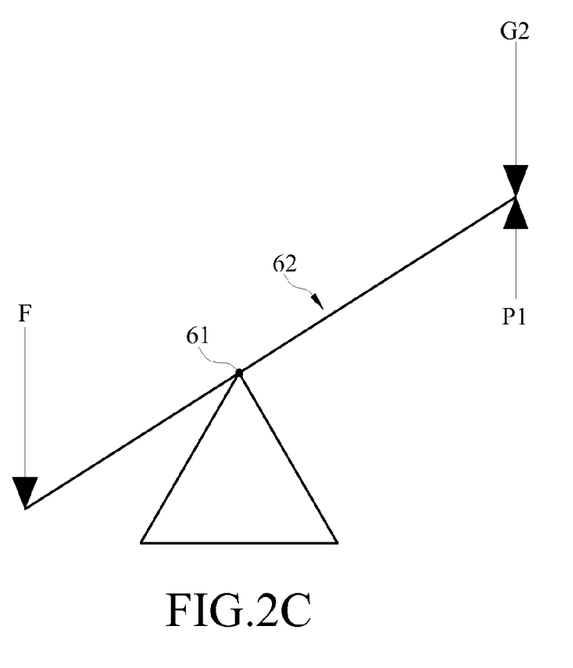
FIG. 2C is a diagram describing the leverage in FIG. 2A.

Please refer to the FIG. 2A and FIG. 2C, FIG. 2C is a diagram describing the leverage in FIG. 2A. Some of the liquid L inside the first chamber 10 illustrated in FIG. 1 flows into the pressure stabilizing device 60 and pushes the first piston 671 upward when the first pressure P1 is so high that the liquid L needs to be stabilized. Because both of the first piston 671 and the third piston 673 are located on the first side 621 of the lever 62, and the first cylinder 661 and the third cylinder 663 are located with the same axis, the third piston 673 moves upward as well and accordingly compresses the volume of the second gas G2 inside the third chamber 63. According to the Boyle's Law, the pressure of the second gas G2 rises with the compressed volume. Therefore, the third moment on the fulcrum 61, generated from the force of the second gas G2 being applied to the lever 62, increases, namely, the clockwise-direction moment increases. At this moment, the first side 621 of the lever 62 moves upward, while the second side 622 moves downward, for driving the second piston 672 moves downward as well. The compensation controller 65 accordingly supplies the compensating fluid F for the compensation chamber 64. The compensation controller 65 acquires the change of volume of the compressed second gas G2 and thereby calculates the increasing value of the third moment exerted by the second gas G2, according to the supplement of the compensating fluid F and the size of the lever 62. Moreover, the compensation controller 65 actively controls the pressure of the compensating fluid F, in order to increase the second moment on the fulcrum 61 produced from the force of the compensating fluid F and the lever 62, namely, to increase the counterclockwise-direction moment. The increasing value of the third moment is the same as that of the second moment, which enables the first moment to keep stable and constant. Therefore, the equilibrium of the moments of the lever 62 resulted from the second moment and the third moment stabilizes the first pressure P1 on the condition that there is no alteration in the first pressure P1.

Figure 2D:
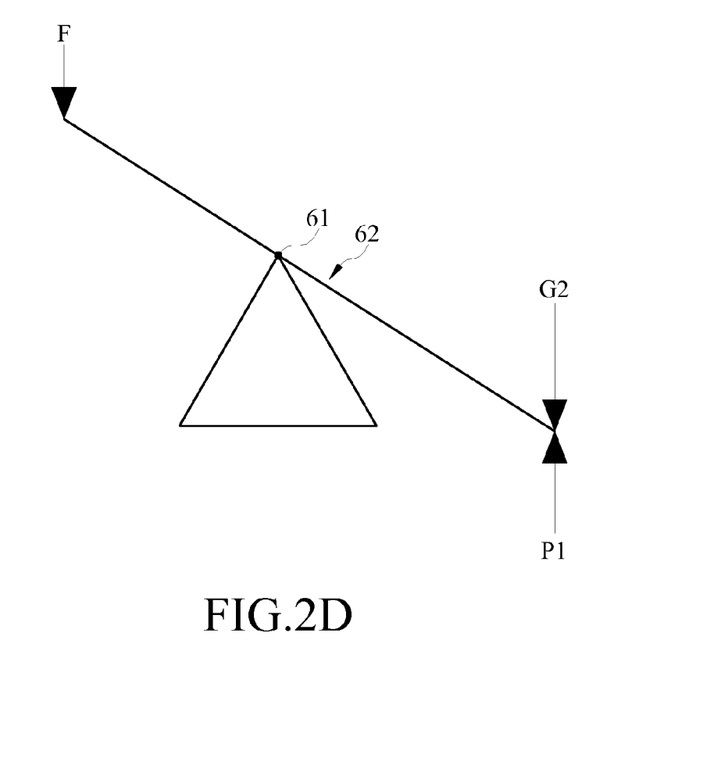
FIG. 2D is a diagram describing the leverage in FIG. 2B.

Please refer to the FIG. 2B and FIG. 2D, FIG. 2D is a diagram describing the leverage in FIG. 2B. Some of the liquid L inside the pressure stabilizing device 60 flows back to the first chamber 10 illustrated in FIG. 1 and pushes the first piston 671 downward when the first pressure P1 is so low that the liquid L needs to be stabilized. Because both of the first piston 671 and the third piston 673 are located on the first side 621 of the lever 62, the third piston 673 moves downward as well and accordingly expands the volume of the second gas G2 inside the third chamber 63. According to the Boyle's Law, the pressure of the second gas G2 decreases with the expanded volume. Therefore, the third moment on the fulcrum 61, resulted from the force of the second gas G2 being applied to the lever 62, decreases, namely, the clockwise-direction moment decreases. At this moment, the first side 621 of the lever 62 moves downward, while the second side 622 moves upward for driving the second piston 672 to move upward as well. The compensating fluid F inside the compensation chamber 64 accordingly flows back to the compensation controller 65. The compensation controller 65 acquires the change of volume of the expanded second gas G2 and thereby calculates the decreasing value of the third moment exerted by the second gas G2, according to the reflux of the compensating fluid F and the size of the lever 62. Moreover, the compensation controller 65 actively controls the pressure of the compensating fluid F, in order to decrease the second moment on the fulcrum 61 producing from the force of the compensating fluid F and the lever 62, namely, to decrease the counterclockwise-direction moment. The decreasing volume of the third moment is the same as that of the second moment, which enables the first moment to keep stable and constant. Therefore, the equilibrium of the moments of the lever 62 resulted from the second moment and the third moment stabilizes the first pressure P1 on the condition that there is no alteration in the first pressure P1.

The energy exerted by the compensating fluid F from the compensation chamber 64 can be partially recovered from the expansion of the second gas G2 when the second gas G2 is compressed.

In some other embodiments of the disclosure, the pressure stabilizing device 60 further includes a pressure sensor (not shown), which is located in the third chamber 63 and is connected with the compensation controller 65. The pressure of the second gas G2 sensed by the pressure sensor is transmitted to the compensation controller 65. The compensation controller 65 controls the compensating fluid F in order to increase or decrease the second moment according to the increasing pressure of the second gas G2.

In some other embodiments of the disclosure, the pressure stabilizing device 60 further includes a pressure sensor, which is located between the first cylinder 661 and the first chamber 10 illustrated in FIG. 1, and is connected with the compensation controller 65. The pressure sensor senses the first pressure P1. The compensation controller 65 controls the compensating fluid F in order to increase or decrease the second moment according to the increasing pressure of the first pressure P1, for keeping the first pressure P1 constant.

Figure 3A:
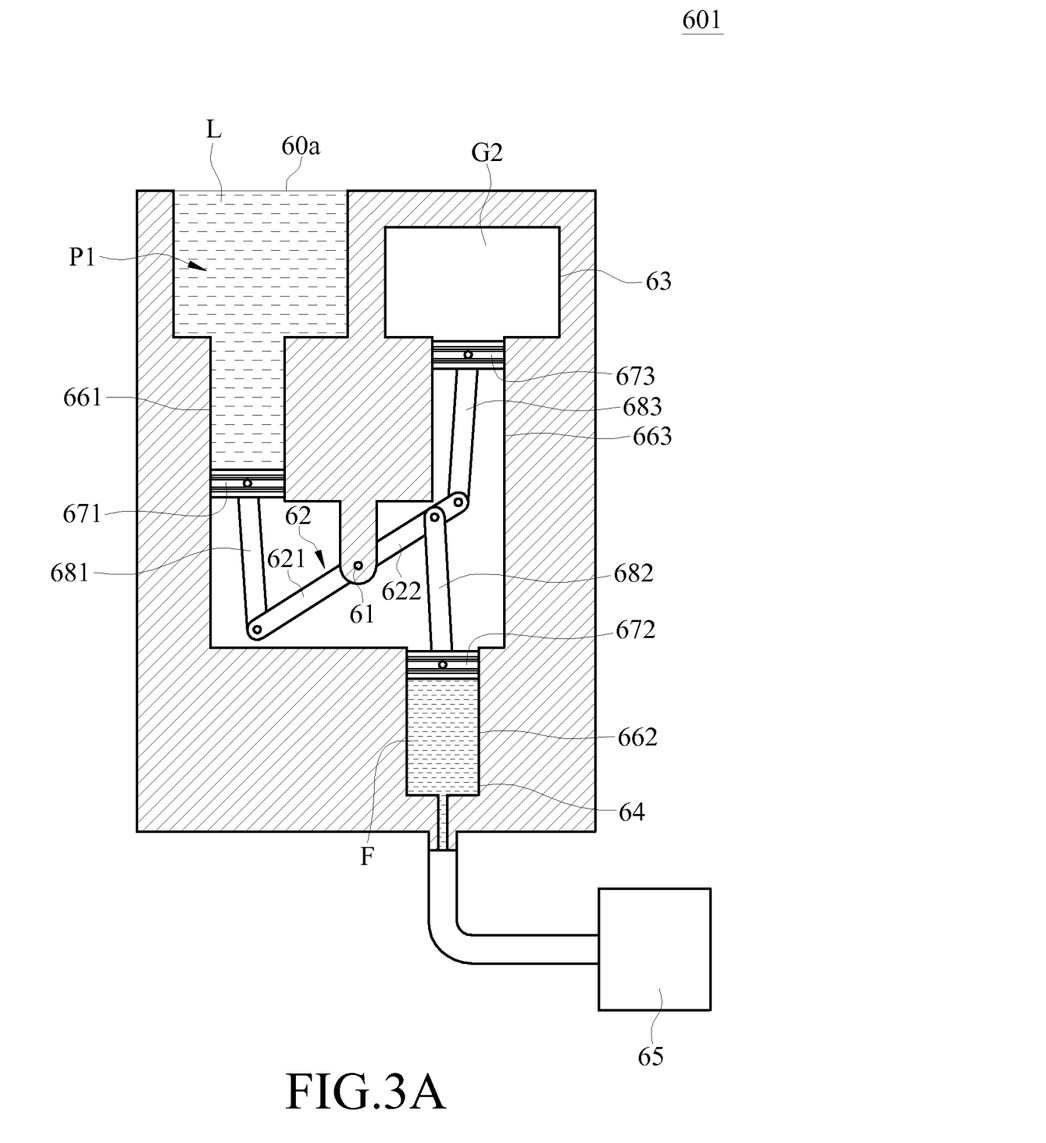
FIG. 3A and FIG. 3B are the cross-sectional views of another pressure stabilizing device according to an embodiment of the disclosure.
Figure 3B:
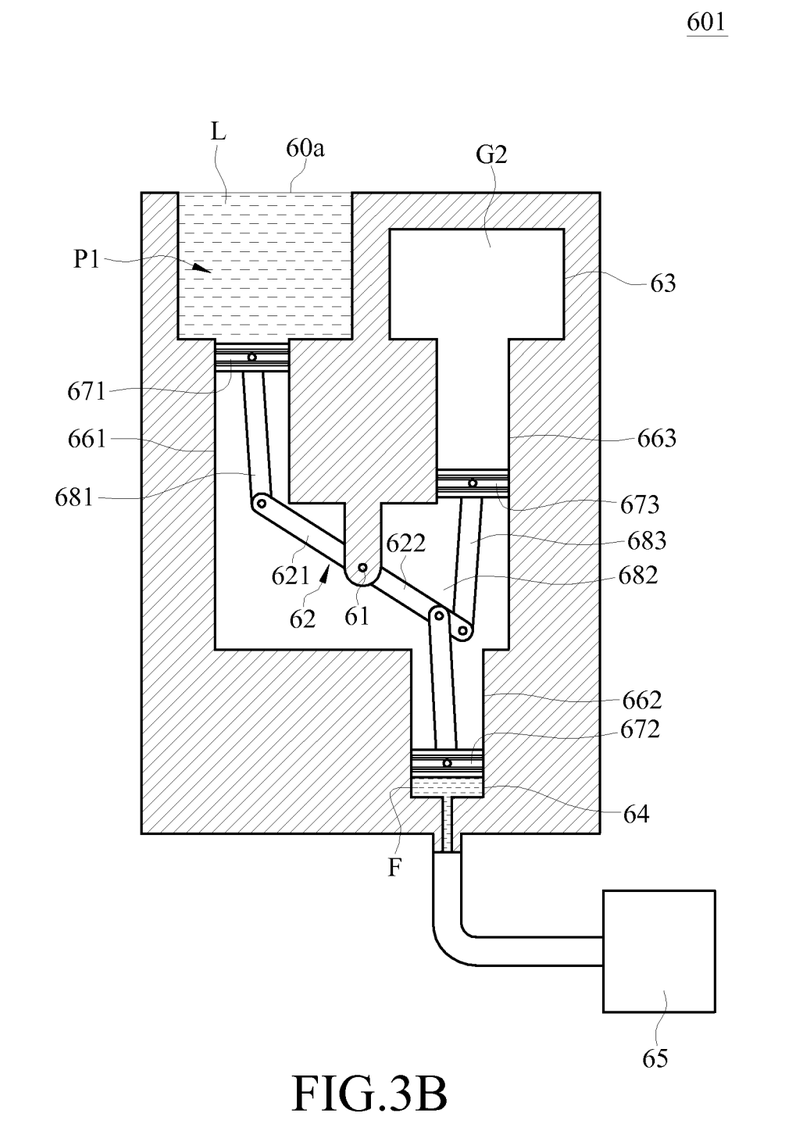

Please refer to the FIG. 3A and FIG. 3B, which are the cross-sectional view of another pressure stabilizing device according to an embodiment of the disclosure. The pressure stabilizing device 601 is similar to the pressure stabilizing device 60, and the pressure stabilizing device 601 is also connected with the connected hole 11 of the first chamber 10 via the connected port 60a. The pressure stabilizing device 601 further includes a fulcrum 61, a lever 62, a third chamber 63, a compensating fluid F, a compensation chamber 64, a compensation controller 65, a first cylinder 661, a second cylinder 662, a third cylinder 663, a first piston 671, a second piston 672, a third piston 673, a first connecting rod 681, a second connecting rod 682 and a third connecting rod 683. The third chamber 63 contains a second gas G2. The compensation chamber 64 contains the compensating fluid F. The liquid L inside the first chamber 10 pushes the first piston 671 inside the first cylinder 661 by the first pressure P1.

Similarly, the lever 62 has a first side 621 and a second side 622 which are opposite to each other, and the first side 621 and the second side 622 are separated by the fulcrum 61. However, the first piston 671 is pivoted on the first side 621, while the second piston 672 and the third piston 673 are pivoted on the second side 622. An applied force is performed on the first side 621 by the first piston 671, and the applied force exerts the first moment on the fulcrum 61. An applied force is performed on the second side 622 by the second piston 672, and the applied force exerts the second moment on the fulcrum 61. However, in the pressure stabilizing device 601, an applied force is performed on the second side 622 by the third piston 673, and the applied force exerts the third moment on the fulcrum 61. The first cylinder 661 and the third cylinder 663 are separated from the second cylinder 662 by the lever 62.

As shown by the FIG. 3A, some of the liquid L inside the first chamber 10 illustrated in FIG. 1 flows into the pressure stabilizing device 60 via the connected port 60a and pushes the first piston 671 downward when the first pressure P1 is so high that the liquid L needs to be stabilized. At this moment, the first side 621 of the lever 62 moves downward, while the second side 622 moves upward which makes the third piston 673 move upward as well. The third piston 673 moves upward and accordingly compresses the volume of the second gas G2 inside the third chamber 63. According to the Boyle's Law, the pressure of the second gas G2 rises with the compressed volume. Therefore, the third moment on the fulcrum 61 generated from the force of the second gas G2 being applied to the lever 62 increases, namely, the clockwise-direction moment increases. Because the second side 622 of the lever 62 moves upward, which makes the second piston 672 move upward, the compensation controller 65 accordingly supplies the compensating fluid F for the compensation chamber 64. The compensation controller 65 acquires the change of the volume of the compressed second gas G2 and thereby calculates the increasing value of the third moment exerted by the second gas G2, according to the supplement of the compensating fluid F and the size of the lever 62. Moreover, the compensation controller 65 actively controls the pressure of the compensating fluid F, in order to increase the second moment on the fulcrum 61 produced from the force of the compensating fluid F and the lever 62, namely, to increase the counterclockwise-direction moment. The increasing volume of the third moment is the same as that of the second moment, which enables the first moment to keep stable and constant. Therefore, the equilibrium of the moments of the lever 62 resulted from the second moment and the third moment stabilizes the first pressure P1 on the condition that there is no alteration in the first pressure P1.

As shown by the FIG. 3B, some of the liquid L inside the pressure stabilizing device 60 flows back to the first chamber 10 illustrated in FIG. 1 and pushes the first piston 671 upward when the first pressure P1 is so low that the liquid L needs to be stabilized. At this moment, the first side 621 of the lever 62 moves upward, while the second side 622 moves downward which makes the third piston 673 move downward as well. The third piston 673 moves downward and accordingly expands the volume of the second gas G2 inside the third chamber 63. According to the Boyle's Law, the pressure of the second gas G2 decreases with the expanded volume. Therefore, the third moment on the fulcrum 61, resulted from the force of the second gas G2 being applied to the lever 62 decreases, namely, the clockwise-direction moment decreases. Because the second side 622 of the lever 62 moves upward, which makes the second piston 672 move upward, the compensating fluid F inside the compensation chamber 64 accordingly flows back to the compensation controller 65. The compensation controller 65 acquires the change of volume of the expanded second gas G2 and thereby calculates the decreasing value of the third moment exerted by the second gas G2, according to the reflux of the compensating fluid F and the size of the lever 62. Moreover, the compensation controller 65 actively controls the pressure of the compensating fluid F, in order to decrease the second moment on the fulcrum 61 produced from the force of the compensating fluid F and the lever 62, namely, to decrease the counterclockwise-direction moment. The decreasing volume of the third moment is the same as that of the second moment, which enables the first moment to keep stable and constant. Therefore, the equilibrium of the moments of the lever 62 resulted from the second moment and the third moment stabilizes the first pressure P1 on the condition that there is no alteration in the first pressure P1.

Figure 4A:
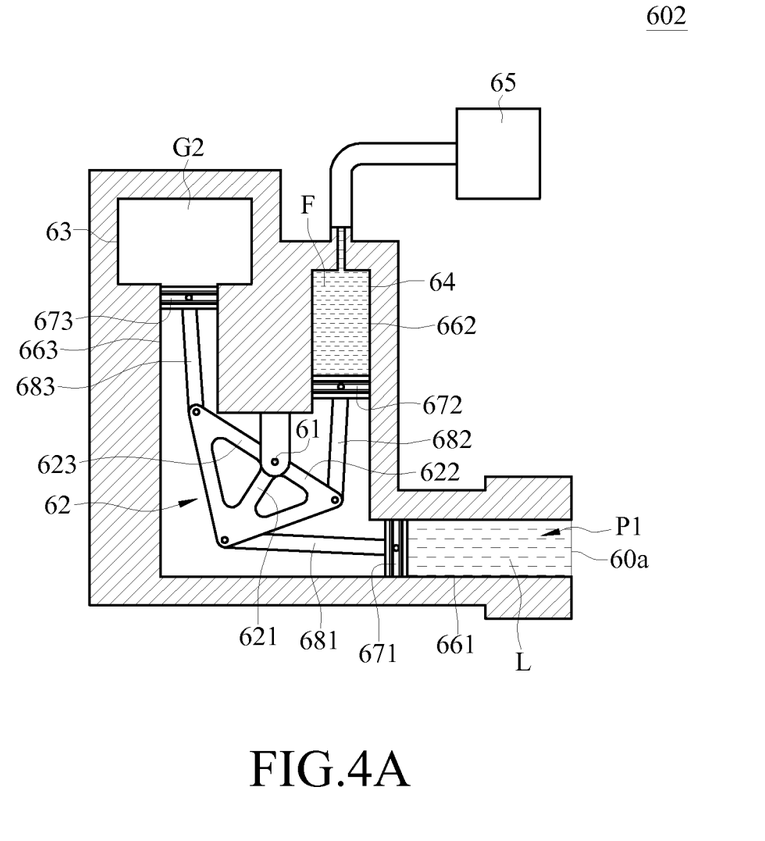
FIG. 4A and FIG. 4B are the cross-sectional views of yet another pressure stabilizing device according to an embodiment of the disclosure.
Figure 4B:
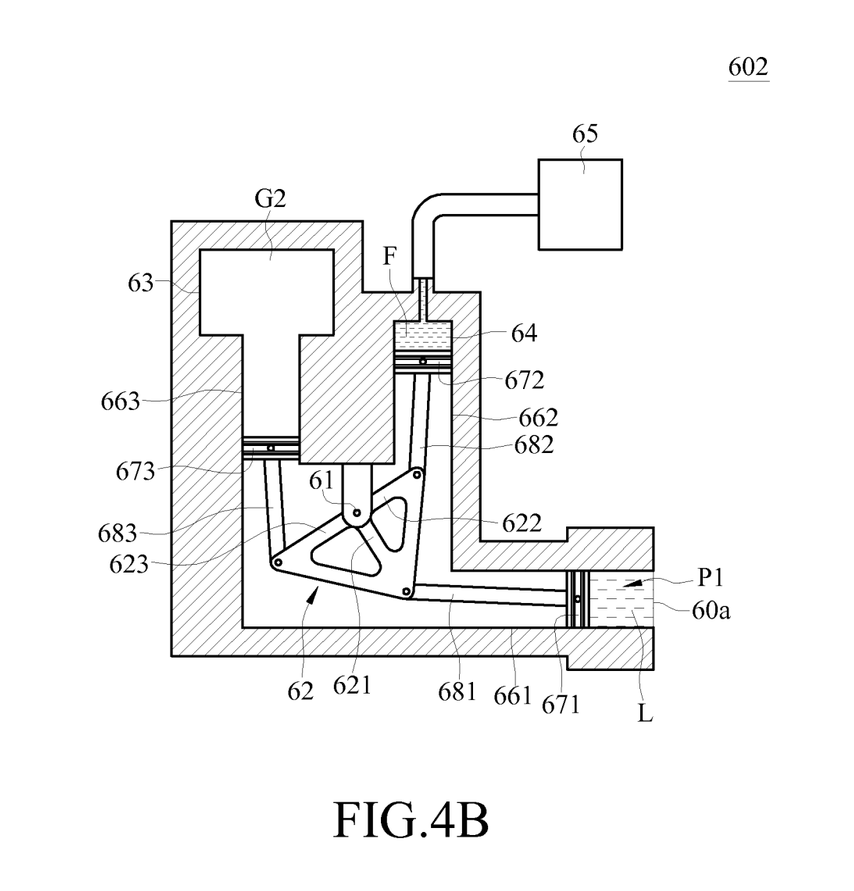

Please refer to FIG. 4A and FIG. 4B, which are the cross-sectional view of another pressure stabilizing device according to an embodiment of the disclosure. The pressure stabilizing device 602 is similar to the pressure stabilizing device 60, and the pressure stabilizing device 602 is also connected with the connected hole 11 of the first chamber 10 via the connected port 60a. The pressure stabilizing device 602 further includes a fulcrum 61, a lever 62, a third chamber 63, a compensating fluid F, a compensation chamber 64, a compensation controller 65, a first cylinder 661, a second cylinder 662, a third cylinder 663, a first piston 671, a second piston 672, a third piston 673, a first connecting rod 681, a second connecting rod 682 and a third connecting rod 683. The third chamber 63 contains a second gas G2. The compensation chamber 64 contains the compensating fluid F. The liquid L inside the first chamber 10 pushes the first piston 671 inside the first cylinder 661 by the first pressure P1.

In this embodiment of the disclosure, the lever 62 has a second side 622 and a third side 623 which are separated by the fulcrum 61 and are opposite to each other, and wherein a first side 621 is located between the second side 622 and the third side 623. However, the first piston 671 is pivoted on the first side 621, while the second piston 672 is pivoted on the second side 622 and the third piston 673 is pivoted on the third side. An applied force is performed on the first side 621 by the first piston 671, and the applied force exerts the first moment on the fulcrum 61. An applied force is performed on the second side 622 by the second piston 672, and the applied force exerts the second moment on the fulcrum 61. An applied force is performed on the third side 623 by the third piston 673, and the applied force exerts the third moment on the fulcrum 61. Both the first moment and the second moment have the same directions which are clockwise, while the third moment is counterclockwise that is contrary to the first moment and the second moment. The axis of the first cylinder 661 is perpendicular to the axis of the third cylinder 663, but the disclosure is not limited thereto. In some other embodiments of the disclosure, the axis of the first cylinder 661 and the axis of the third cylinder 663 are intersected by an angle greater than or less than ninety degrees.

As shown by the FIG. 4A, the partial liquid L inside the first chamber 10 illustrated in FIG. 1 flows into the pressure stabilizing device 60 via the connected port 60a and pushes the first piston 671 leftward when the first pressure P1 is so high that the liquid L needs to be stabilized. At this moment, the first side 621 of the lever 62 moves leftward, while the third side 623 moves upward which makes the third piston 673 move upward as well. The third piston 673 moves upward and accordingly compresses the volume of the second gas G2 inside the third chamber 63. According to the Boyle's Law, the pressure of the second gas G2 rises with the compressed volume. Therefore, the third moment on the fulcrum 61 generated from the force of the second gas G2 being applied to the lever 62 increases, namely, the counterclockwise-direction moment increases. At this moment, the second side 622 of the lever 62 moves downward, which makes the second piston 672 move downward, the compensation controller 65 accordingly supplies the compensating fluid F for the compensation chamber 64. The compensation controller 65 acquires the change of the compressed second gas G2 and thereby calculates the increasing value of the third moment exerted by the second gas G2, according to the supplement of the compensating fluid F and the size of the lever 62. Moreover, the compensation controller 65 actively controls the pressure of the compensating fluid F, in order to increase the second moment on the fulcrum 61 produced from the force of the compensating fluid F and the lever 62, namely, to increase the clockwise-direction moment. The increasing volume of the third moment is the same as that of the second moment, which enables the first moment to keep stable and constant. Therefore, the equilibrium of the moments of the lever 62 resulted from the second moment and the third moment stabilizes the first pressure P1 on the condition that there is no alteration in the first pressure P1.

As shown by the FIG. 4B, some of the liquid L inside the pressure stabilizing device 60 flows back to the first chamber 10 illustrated in FIG. 1 and pushes the first piston 671 rightwards when the first pressure P1 is so low that the liquid L needs to be stabilized. At this moment, the first side 621 of the lever 62 moves rightwards, while the third side 623 moves downward which makes the third piston 673 move downward as well. The third piston 673 moves downward and accordingly expands the volume of the second gas G2 inside the third chamber 63. According to the Boyle's Law, the pressure of the second gas G2 decreases with the expanded volume. Therefore, the third moment on the fulcrum 61 resulted from the force of the second gas G2 being applied to the lever 62 decreases, namely, the counterclockwise-direction moment decreases. At this moment, the second side 622 of the lever 62 moves upward, which makes the second piston 672 moves upward, the compensating fluid F inside the compensation chamber 64 accordingly flows back to the compensation controller 65. The compensation controller 65 acquires the change of volume of the expanded second gas and thereby calculates the decreasing value of the third moment exerted by the second gas G2, according to the reflux of the compensating fluid F and the size of the lever 62. Moreover, the compensation controller 65 actively controls the pressure of the compensating fluid F, in order to decrease the second moment on the fulcrum 61 produced from the force of the compensating fluid F and the lever 62, namely, to decrease the clockwise-direction moment. The decreasing volume of the third moment is the same as that of the second moment, which enables the first moment to keep stable and constant. Therefore, the equilibrium of the moments of the lever 62 resulted from the second moment and the third moment stabilizes the first pressure P1 on the condition that there is no alteration in the first pressure P1.

According to the energy capturing system and pressure stabilizing device thereof in the disclosure described above, the energy capturing device is located in the opening of the spacer element between the first chamber and the second chamber, so the energy capturing system is used to capture the differential energy between the first pressure P1 and the second pressure P2. The liquid having the first pressure P1 is converted to the liquid having the second pressure P2 only by passing through the energy capturing device, instead of passing through the pipes. Therefore, the waste of the differential energy between the first pressure P1 and the second pressure P2 resulted from the friction between the liquid L and the pipes is avoided. In addition, the pressure stabilizing device is connected with the first chamber for stabilizing the first pressure P1 of the liquid L in the first chamber. The aim of the pressure stabilizing device is to maintain the first pressure, because the first moment exerted on the fulcrum by the first pressure is in the same direction with the second moment by the compensating fluid but is contrary to the third moment by the gas, and the compensating fluid compensates the moment exerted by the gas.

What is claimed is:
1. An energy capturing system, comprising:
a first chamber for containing a liquid;
a second chamber for containing the liquid;
a spacer element located between the first chamber and the second chamber, the second chamber connected with the first chamber via an opening of the spacer element;
a pressurization device, two ends of the pressurization device connected with the first chamber and the second chamber, respectively;
an energy capturing device located on the opening;
a pressure stabilizing device connected with the first chamber, wherein the pressure stabilizing device comprises:
a fulcrum;
a lever pivoted on the fulcrum;
a third chamber for containing a first gas;
a compensating fluid, a compensation chamber for containing the compensating fluid, and a compensation controller connected with the compensation chamber;
a first cylinder connected with the first chamber, a second cylinder connected with the compensation chamber, a third cylinder connected with the third chamber; and
a first piston, a second piston and a third piston, wherein the first piston, the second piston and the third piston are located in the first cylinder, the second cylinder and the third cylinder, respectively, and the first piston, the second piston and the third piston are pivoted on the lever; and
a one-way valve, located on the pressurization device and adapted to limit the liquid to only flow from the second chamber to the pressurization device and the first chamber in sequence.

2. The energy capturing system according to claim 1, wherein the lever has a first side and a second side which are opposite to each other, and the first side and the second side are separated by the fulcrum.

3. The energy capturing system according to claim 1, wherein the lever has a first side, a second side and a third side, wherein the second side and the third side are separated by the fulcrum and are opposite to each other, and wherein the first side is located between the second side and the third side.

4. The energy capturing system according to claim 1, wherein the pressure stabilizing device further comprises a pressure sensor located on the third chamber and connected with the compensation controller.

5. The energy capturing system according to claim 1, wherein the pressure stabilizing device further comprises a pressure sensor located between the first cylinder and the first chamber, and wherein the pressure sensor is connected with the compensation controller.

6. The energy capturing system according to claim 1, further comprising an elastic membrane, wherein the second chamber is adapted to contain a second gas, and the elastic membrane is adapted to separate the second gas from the liquid.

7. The energy capturing system according to claim 1, wherein the pressurization device comprises a fan blade or a buoy.

8. The energy capturing system according to claim 1, further comprising a pressure valve located on another opening of the spacer element.

9. A pressure stabilizing device, comprising:
a fulcrum;
a lever pivoted on the fulcrum;
a second chamber for containing a gas;
a compensating fluid, a compensation chamber for containing the compensating fluid, and a compensation controller connected with the compensation chamber;
a first cylinder connected with a first chamber, a second cylinder connected with the compensation chamber, a third cylinder connected with the second chamber; and
a first piston, a second piston and a third piston, wherein the first piston, the second piston and the third piston are located in the first cylinder, the second cylinder and the third cylinder, respectively, and the first piston, the second piston and the third piston are pivoted on the lever.

10. A pressure stabilizing device according to claim 9, wherein the lever has a first side and a second side which are opposite to each other, and the first side and the second side are separated by the fulcrum.

11. A pressure stabilizing device according to claim 9, wherein the lever has a first side, a second side and a third side, wherein the second side and the third side are separated by the fulcrum and are opposite to each other, and wherein the first side is located between the second side and the third side.

12. A pressure stabilizing device according to claim 9, further comprising a pressure sensor located on the second chamber and connected with the compensation controller.

13. A pressure stabilizing device according to claim 9, further comprising a pressure sensor located between the first cylinder and the first chamber, and wherein the pressure sensor is connected with the compensation controller.

* * * * *